United States Patent
Voipio

[19]
[11] Patent Number: 5,949,549
[45] Date of Patent: Sep. 7, 1999

[54] COLORIMETER WITH A BEAMSPLITTING PRISM

[75] Inventor: Ville Voipio, Vantaa, Finland

[73] Assignee: Janesko Oy, Vantaa, Finland

[21] Appl. No.: 09/140,681

[22] Filed: Aug. 26, 1998

[30] Foreign Application Priority Data

Aug. 26, 1997 [FI] Finland ...................................... 973498

[51] Int. Cl.⁶ .............................. H04N 1/00; H04N 1/36; H04N 1/40

[52] U.S. Cl. .......................... 356/402; 356/405; 356/406; 356/407; 356/409; 356/410; 356/414; 356/425; 356/445; 356/446

[58] Field of Search .................................... 356/405, 406, 356/407, 409, 410, 411, 414, 421, 402, 425, 445, 446, 448

[56] References Cited

U.S. PATENT DOCUMENTS

| | | | |
|---|---|---|---|
| 4,932,779 | 6/1990 | Keane | 356/446 |
| 5,019,715 | 5/1991 | Sting et al. | 356/445 |
| 5,305,093 | 4/1994 | Dosmann | 356/414 |

FOREIGN PATENT DOCUMENTS 2 363 431  6/1974  Germany.
1 448 687  9/1976  United Kingdom.

*Primary Examiner*—Frank G. Font
*Assistant Examiner*—Roy M. Punnoose
*Attorney, Agent, or Firm*—Burns, Doane, Swecker & Mathis, L.L.P.

[57] ABSTRACT

A colorimeter for measuring colour of process medium comprising two light sources and two detectors both light sources being arranged to emit a beam through the process medium and the windows adjoining the process medium to both detectors. In order to achieve a solution functioning reliably the windows adjoining the process medium at both light sources are formed from a triangular prism, the two surfaces of which being at an angle to each other, are arranged to divide the beam arriving from the light source into two beams travelling in different directions so that both beams proceed to the process medium through the same part of the window surface formed by a third surface of the prism. Mirror surfaces arranged to gather radiation arriving form both light sources to a sensor of the detector are formed at both detectors.

6 Claims, 3 Drawing Sheets

5,949,549

COLORIMETER WITH A BEAMSPLITTING PRISM

BACKGROUND OF THE INVENTION

The invention relates to a colorimeter for measuring colour of process liquid comprising two light sources and two detectors, both light sources being arranged to emit a beam through a process medium and through windows adjoining the process medium to both detectors, the detectors being arranged to convert the beam arriving from the light sources to electrical signal.

Such colorimeters based on the four-ray principle are currently known in connection with various industrial processes and measurements associated thereto. Even though several features affecting the measurement results disadvantageously can in theory be eliminated by the four-ray principle, the drawback of known solutions has, however, been their laborious use, and also the inaccuracy of the measurement in practice. The measurement inaccuracy can be caused by, for example, a light beam that is not an ideal light beam in practice. Inaccuracy can furthermore be caused by used optics that may include local differences i.e. the windows, through which the light beams pass, can be fouled in various ways in different points, the light beams passing through the different points in the window thus attenuating in different ways etc.

SUMMARY OF THE INVENTION

An object of the invention is to provide a colorimeter by which prior art drawbacks can be eliminated. This is achieved with the colorimeter of the invention characterized in that the windows adjoining the process liquid at both light sources are formed from a triangular prism, the two surfaces of which being at an angle to each other, are arranged to divide the beam arriving from the light source into two beams travelling in different directions so that both beams proceed to the process liquid through the same part of the window surface formed by a third surface of the prism and that mirror surfaces arranged to gather radiation arriving from both light sources to the detector sensor are formed at both detectors.

An advantage of the invention is above all that it is simple and that it has been possible to eliminate very advantageously the drawbacks caused by, for example, local fouling of the windows. Owing to the very simple structure the manufacturing costs of the colorimeter of the invention remain moderate. Another advantage of the invention is that it is easy to use, since for example the need for calibration is insignificant. A further advantage is that the colorimeter of the invention can be implemented as a very safe structure, in which case there is, for example, no danger of sparking and the meter can be used on premises liable to explode.

BRIEF DESCRIPTION OF THE DRAWINGS

In the following, the invention will be described in greater detail by means of a prior art solution and a preferred embodiment of the invention with reference to the accompanying drawings in which.

DETAILED DESCRIPTION OF THE INVENTION

Figure 1:
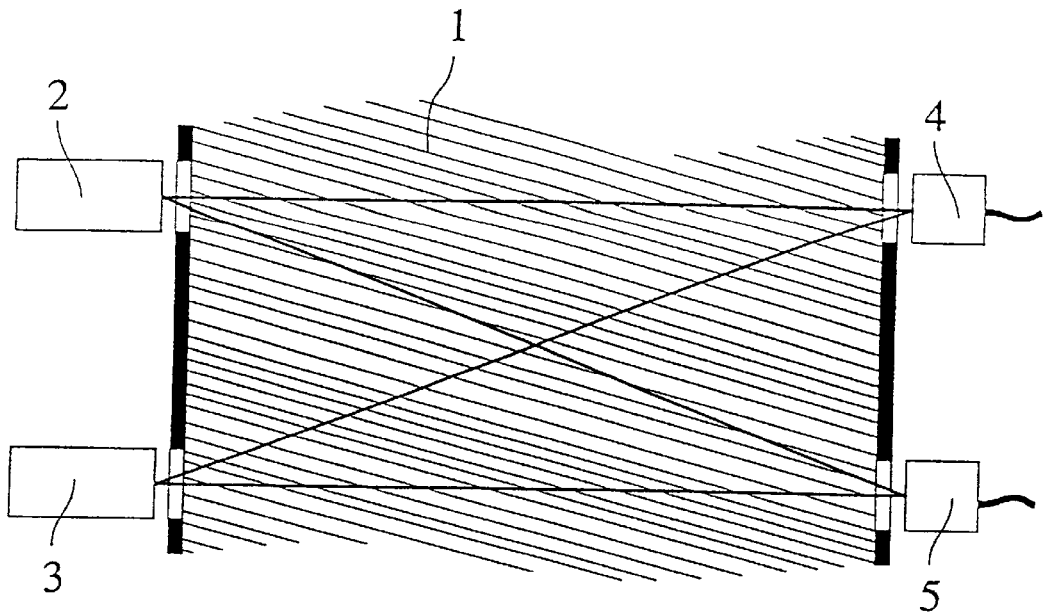
FIG. 1 is a schematic view showing a prior art measuring instrument solution based on the four-ray principle.

FIG. 1 shows an example of a prior art colorimeter solution based on the four-ray principle. Reference number 1 indicates a process medium that is being measured, reference numbers 2 and 3 indicate light sources and reference numbers 4 and 5 indicate detectors. The lines in FIG. 1 indicate the principle on how the light beams travel from the light sources 2, 3 through the process medium to the detectors 4, 5. The light beams travel to and from the process liquid through optical window structures. Prior art window structures are optically undeveloped. Windows made, for example, of teflon are used as window structures. The operational principle of the solution in FIG. 1 is known to one skilled in the art and therefore not described here in more detail. Here it is only generally noted that the basis for the four-ray principle is to compare light travelling a short and a long way in the process liquid.

Figure 2:
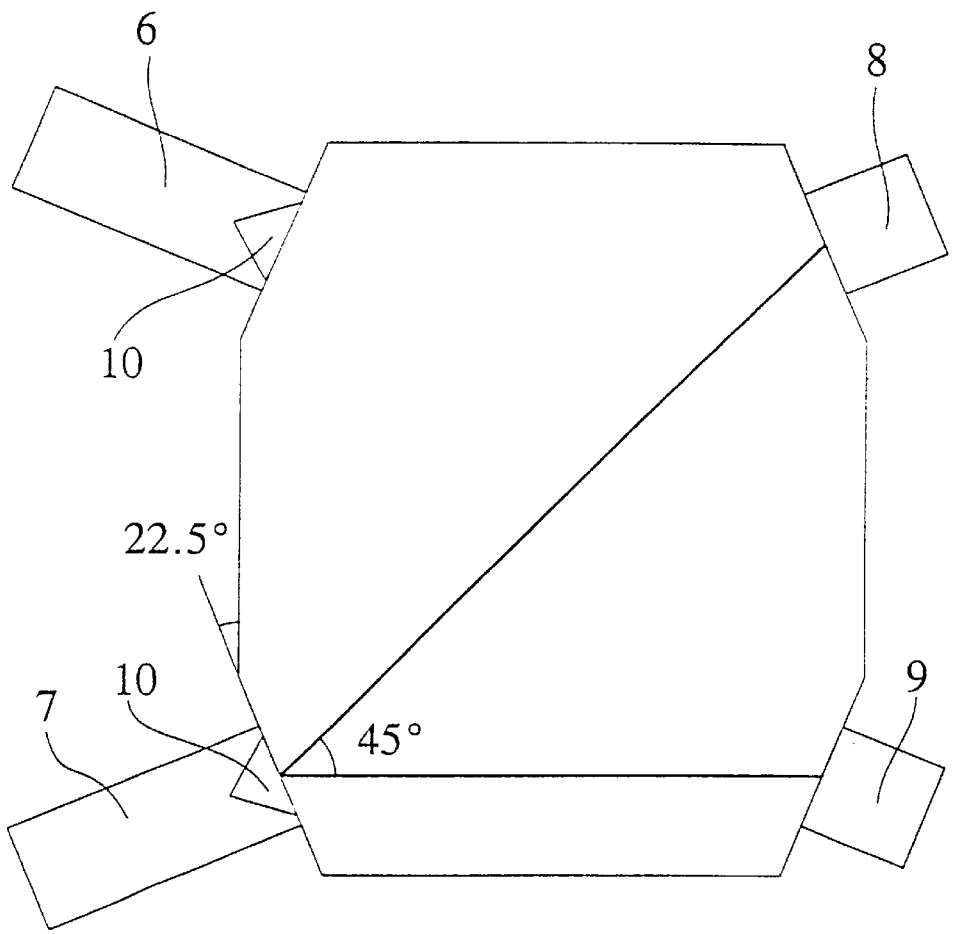
FIG. 2 is a schematic view showing the basic principle of the colorimeter of the invention.

FIG. 2 shows the basic principle of the colorimeter of the invention. In the example shown in FIG. 2 light sources 6, 7 and detectors 8, 9 are located in the corners of a rectangle. Such a disposition is naturally not the only possibility, but the example in the Figure is one preferable way of implementing the basic idea of the invention. The process medium to be measured, for example the process liquid, is arranged in the substantially rectangular space shown in the Figure. FIG. 2 shows the routes of the light beams travelling from the light sources to the detectors through the process medium by means of the lines moving from the light source 6 to the detectors 8 and 9. The light beam travels correspondingly from the light source 7 to the detectors 8 and 9. The lines, angle values and measurements indicated in the Figure do not restrict the invention in any way but are shown merely as examples and as supplementary information to illustrate the invention.

As for the colorimeter of the invention it is essential that the windows adjoining the process medium at both the light sources 6, 7 are formed from a triangular prism 10, the two surfaces of which being at an angle to each other are arranged to divide the beam arriving from the light source into two beams travelling in two different directions so that both beams proceed to the process medium through the same part of the window surface formed by a third surface of the prism 10. Mirror surfaces 11 arranged to gather radiation arriving from both the light sources 6, 7 to a sensor of the detector 8, 9 are formed at both detectors 8, 9. The mirror surfaces and sensors within the detectors 8, 9 are not shown in FIG. 2 but in FIGS. 4–7 which will be discussed later on.

The light sources 6, 7 used in the invention are formed from a plurality of LED elements to provide several wavelengths. There may be, for example, seven LED elements, in which case each LED element is selected according to an emitting wavelength. Furthermore it should be noted that if the intention is to provide a similar beam profile for each colour, then the solution should include only one emitting area. Light reflecting from a source formed by separate LED elements can be combined by means of optical fibres and a light mixer by combining each LED element to one end of the optical fibre and by gathering the other ends of the fibres together. A thicker fibre or rod functioning as the light mixer can be attached as an extension to the bunch of fibres thus obtained. The diameter of the optical fibres can be, for example, about 1 mm, and the diameter of the thicker fibre or rod being the extension thereof correspondingly about 3 mm.

Figure 3:
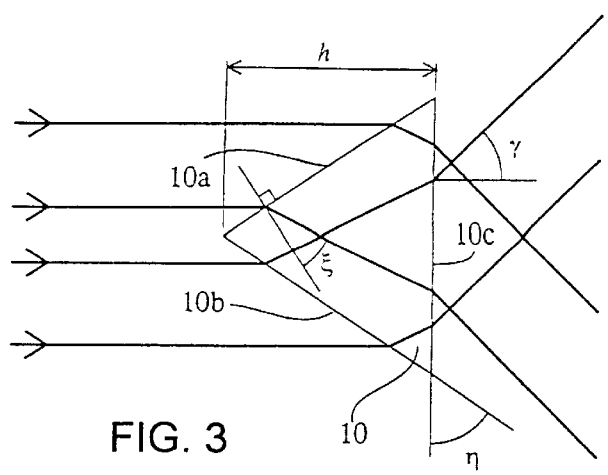
FIG. 3 is a schematic view showing a solution by which a beam arriving from a light source is divided into two beams.

The light beam arriving from the light sources formed according to the principle described above is divided into two beams by means of the principle described in FIG. 3. FIG. 3 shows the prism 10, which also forms the window adjoining the process medium as shown in FIG. 2. The light arriving from the light sources 6, 7 is indicated by arrow lines moving from left to right in FIG. 3. The light beam arriving from the light source is directed to the prism 10 so that the light hits the two prism surfaces 10a and 10b being at an angle to each other, as shown in the Figure. A third surface 10c of the prism 10 forms a surface adjoining the process medium.

The light beam changes direction in the prism 10 in accordance with known regularities in a manner shown in FIG. 3, therefore the light beam arriving from the light source can be divided into two beams travelling in two different directions. As described above, it is essential that the light beams proceeding to the process liquid travel through the same surface part of the window surface. The variable determining to what extent the divided beams travel through the same part of the surface 10c is the height h of the prism. By appropriately selecting the height h of the prism 10 the beams can travel through the same part of the surface 10c. The height h can be calculated on the basis of the diameter of the light beam arriving at the prism and the refraction properties of the manufacturing material of the prism. The prism 10 can naturally be made of any suitable material, for example plastic material, glass etc.

In connection with the detectors 8, 9 it is essential that the light arriving from the light sources 6, 7 is gathered to best possible effect to the detector sensors. For example, a parabolic mirror surface is an efficient means if the light beam is to be focused on a particular point. Since two light beams arriving from different directions are directed to each sensor in the four-ray principle, the mirror surface formed from two parabolic surfaces can be used as a solution.

Figure 4:
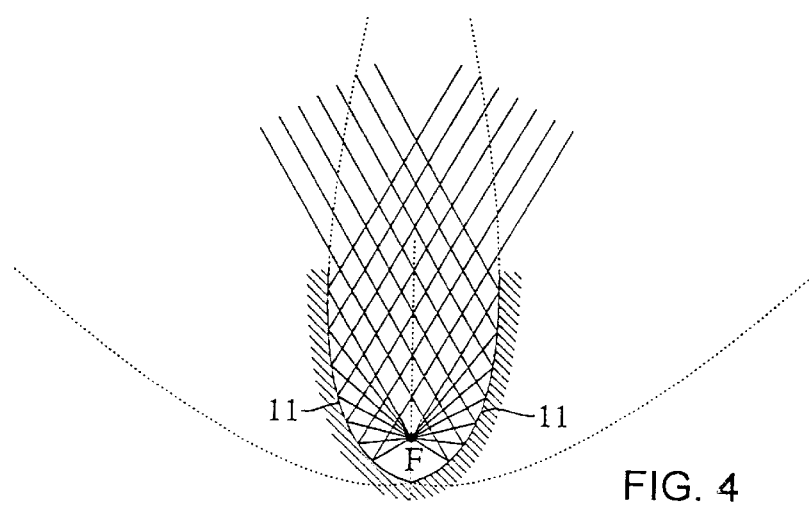
FIG. 4 is a schematic view showing a principle by which the beams arriving from the light sources are directed to a detector.

FIG. 4 shows a preferable example of the principle on how the mirror surface at the detector is formed. The mirror surface is formed from two partly overlapping parabolic surfaces by removing all other parts except for the overlapping ones. The parabolas are arranged to partly overlap so that the focal points of both parabolas are at the same point F. The parts of the parabola surface to be removed are indicated by a dotted line in the Figure and the parts forming the mirror surface are indicated by ruling and also by reference number 11.

Figure 5:
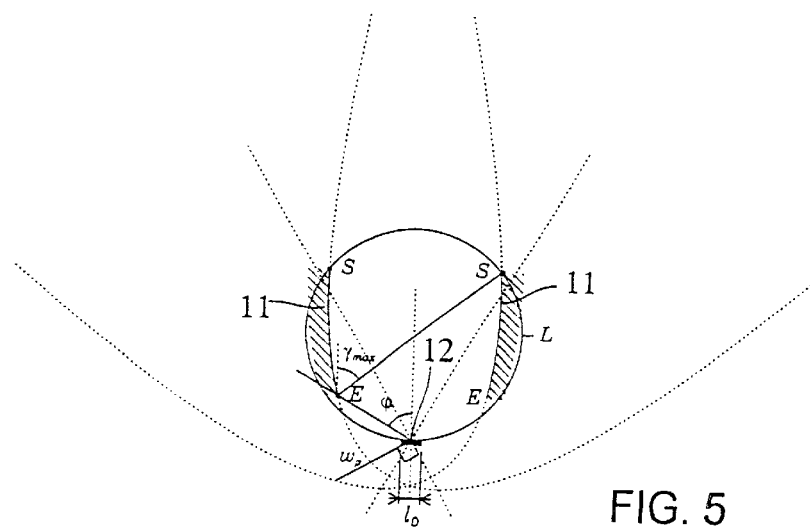
FIG. 5 shows a way by which surfaces directing the beams can be formed.

The beams having a large angle of incidence are inefficient on the sensor since they are easily reflected and are very sensitive as for the location errors of the sensor. Thus, the mirror surface is not needed for large angles of incidence, i.e. the mirror surface part at the bottom of FIG. 4 can be removed as shown in FIG. 5. The mirror surfaces in FIG. 5 are indicated by a similar ruling as in FIG. 4 and also indicated by the same reference number 11. Furthermore, reference number 12 is used in FIG. 5 to indicate a detector sensor.

Looking closer at FIG. 5 it can be noted that in order to provide mirror surfaces three parameters have to be determined: the width $w_p$ of the parabolas and their start points S and end points E. The mirror surface also has to fit into a circle L, the midpoint of which lies on the optical axis and the beam of which is such that the sensor 12, whose length is $1_D$, forms an angle that is greater than or equal to the difference of the minimum $\gamma_{min}$ and maximum $\gamma_{max}$ of the angle of incidence of the incoming radiation. The maximum angle of incidence $\phi$ of radiation arriving at the sensor determines point E. Point S is on the straight line moving through point E and is at an angle $\gamma_{max}$ to the optical axis of the arrangement. The width of the parabolas $w_p$ is selected so that the mirror length is as high as possible.

Figure 6:
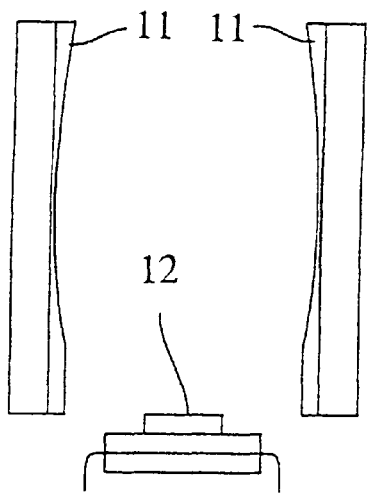
FIG. 6 is a schematic view showing an example of the surfaces directing the beams formed in accordance with FIGS. 4 and 5.
Figure 7:
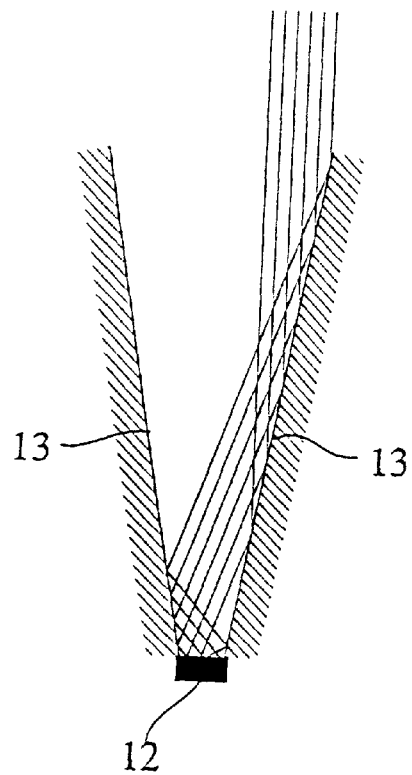
FIG. 7 shows the implementation of second mirror surfaces that are substantially perpendicular to the mirror surfaces according to FIGS. 4–5.

FIG. 6 shows a practical example of the mirror surface solution formed using the principle shown in FIGS. 4 and 5. FIG. 6 uses in corresponding places the same reference numbers as FIGS. 4 and 5. The parabolic surfaces can be formed in any suitable manner, for example by processing a suitable basic material, for example bronze with a machine tool, the working movement of which is directed so that a desired surface shape is accomplished. Surfaces processed using said method can in the next phase be coated with an appropriate face material such as silver. It is clear that other suitable materials and production methods can also be used to form mirror surfaces. FIG. 7 shows the principle according to which the part of the optics that is substantially perpendicular to the mirror surfaces 11 formed by the parabolas is formed by second mirror surfaces 13. As noted above the parabolic mirror surface is quite efficient at gathering light at a desired point. To accomplish an optical arrangement provided with a two-dimensional parabola surface is, however, technically relatively hard. FIG. 7 shows a simple implementation in which, for example the second mirror surfaces 13 that are substantially perpendicular to the mirror surfaces in FIG. 6 arranged at the detector, are formed from flat surfaces arranged at an angle to each other. As shown in FIG. 7 the second mirror surfaces 13 arranged in said way form a gap shrinking in the direction of the light, in which case the light arriving at the wider opening of the gap is gathered as it proceeds to a narrow gap where the detector sensor 12 is located. The size of the angle between the mirror surfaces is arranged according to each situation. In the examples shown in FIGS. 3–7 the parabolic mirror surfaces 11 and level-like mirror surfaces 13 form a cavity-like structure that is rather difficult to carry out. In accordance with the basic idea of the invention the mirror surfaces can also be implemented in reverse. Then using an appropriate material, for example glass, a piece is formed whose outer surfaces correspond in shape to the cavity adjoining the mirror surfaces described above. A glass piece manufactured in said way is coated at the outer surfaces corresponding to the mirror surfaces described above with a suitable material e.g. palladium-rhodium forming the inward facing mirror surface of the piece. An advantage with such an alternative solution is that cleaning mirror surfaces is left out, since the mirror surfaces are protected by the glass material and furthermore a structure, whose outer surfaces are moulded, is production technically easier to provide than a corresponding shape by moulding the inner surfaces.

The above described application examples are not intended to restrict the invention in any way but the invention can freely be modified within the scope of the claims. Hence, it is obvious that the various details of the colorimeter of the invention need not be exactly as shown in the Figures but other kinds of solutions are also possible. For example, converting information arriving at the detectors to electrical signal and transferring said signals can be implemented by means of any appropriate solution etc.

I claim:

1. A colorimeter for measuring color of process liquid comprising two light sources and two detectors, both light sources being arranged to emit a beam through a process medium and through windows adjoining the process medium and the detectors being arranged to convert the beam arriving from the light sources to electrical signal, the windows adjoining the process medium at both light sources being formed from a triangular prism, the two surfaces of which being at an angle to each other are arranged to divide the beam arriving from the light source into two beams travelling in different directions so that both beams proceed to the process medium through the same part of the window surface formed by a third surface of the prism, and the colorimeter further comprising mirror surfaces formed at both detectors, the mirror surfaces being arranged to gather radiation arriving from both light sources to a sensor of the detector.

2. A colorimeter as claimed in claim 1, wherein the mirror surfaces arranged at the detector are formed from parabolic surfaces.

3. A colorimeter as claimed in claim 2, wherein second mirror surfaces lying substantially perpendicular to the parabolic mirror surfaces are arranged at the detector, the second surfaces being formed from flat surfaces arranged at an angle to each other.

4. A colorimeter as claimed in claim 1, wherein both light sources are formed from LED elements and from optical fibres arranged thereby and from a thicker optical fibre or rod functioning as a mixer.

5. A colorimeter as claimed in claim 2, wherein both light sources are formed from LED elements and from optical fibres arranged thereby and from a thicker optical fibre or rod functioning as a mixer.

6. A colorimeter as claimed in claim 3, wherein both light sources are formed from LED elements and from optical fibres arranged thereby and from a thicker optical fibre or rod functioning as a mixer.

* * * * *